UNITED STATES PATENT OFFICE.

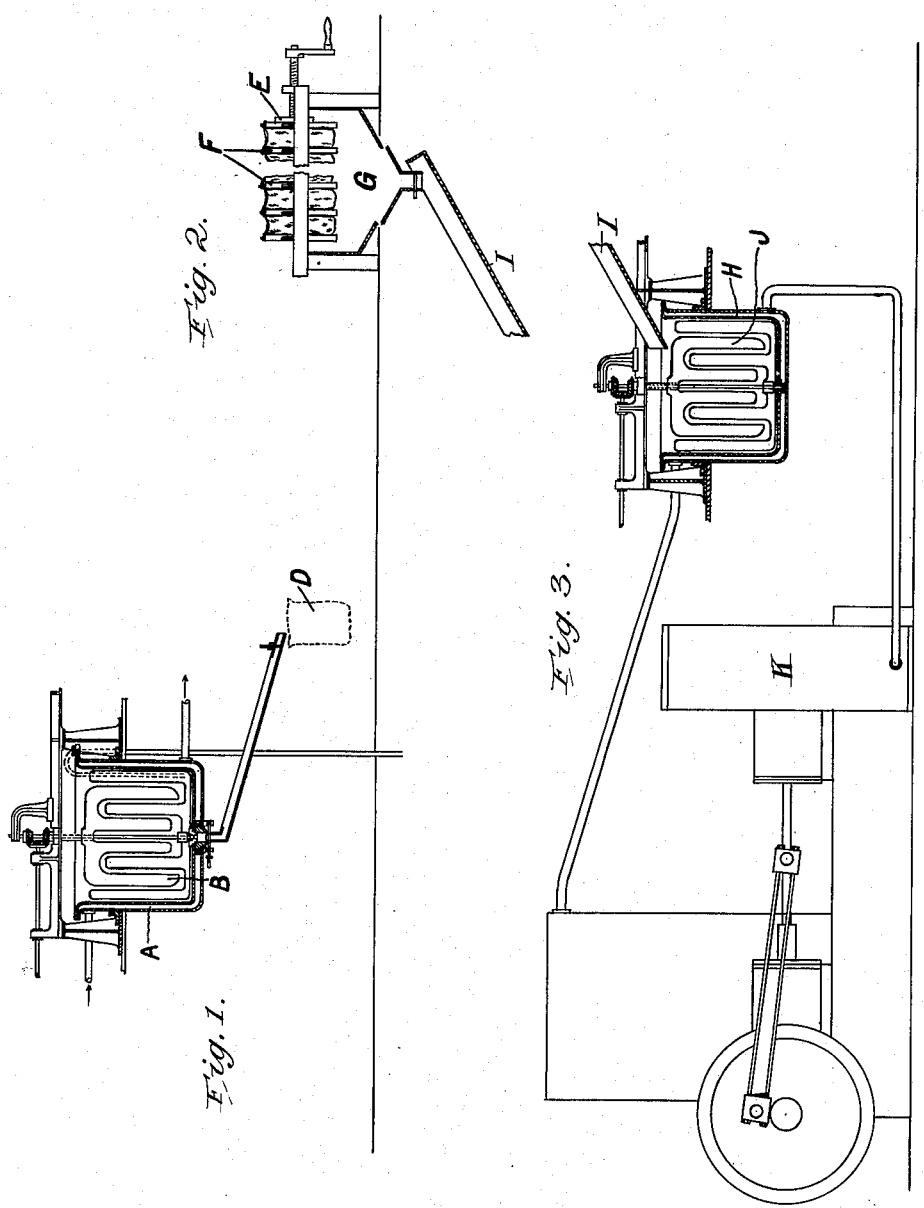

PETER C. D. CASTLE, OF BEBINGTON, ENGLAND, ASSIGNOR TO GUM TRAGASOL SUPPLY COMPANY, LIMITED, OF HOOTON, ENGLAND.

THE EXTRACTION OF GUM.

No. 924,319.      Specification of Letters Patent.      Patented June 8, 1909.

Application filed December 5, 1905. Serial No. 290,464.

*To all whom it may concern:*

Be it known that I, PETER CAMERON DOUGLAS CASTLE, a subject of the King of Great Britain, residing at Bebington, in the county of Chester, in the Kingdom of England, secretary, have invented certain new and useful Improvements in the Extraction of Gum, for which application has been made in Great Britain, No. 10,822, dated May 24, 1905.

In the manufacture of gum tragasol, the gum extracted from the kernels of the locust tree, *Ceritonia Siliquosa*, by all the processes described in my previously existing British patents No. 13345 of '94, No. 24877 of December '94 and 6151, March '99 and particularly by (*a*) first milling the kernels in order to get rid of the husks and germs and then extracting the gum by machinery and steeping the cleaned cotyledons; and also (*b*) by the alternative wet process by which the whole kernels are softened by boiling and steeping and then treated in decorticating machines to free the cotyledons from the husk and germ, there are serious and hitherto insuperable defects and large sums of money have been spent in efforts to remedy the same. For example, in the milling process which is a very expensive one the very best result yet reached has been the obtaining of about one half of the dry cotyledon which produces the gum sufficiently free from husk and germ. This is obtained at a great expense and the other half of the cotyledon is lost in the milling process. Again in my alternative wet process although a somewhat larger percentage of the gum has been obtained, the process is very uncertain, delicate and expensive—while the extracted gum is always more or less discolored by the coloring matters of the husk and germ which unfits it for a great number of the purposes for which it has been advantageously applied. The defects of both processes have thus been—(1) the great cost, (2) the relative small proportion obtained in a useful form of the total quantity originally existing in the kernel, and (3) the discoloration from the husk. After numerous experiments extending over several years I have discovered a process whereby all these. before-mentioned defects have been reduced to a minimum inasmuch as (1) the cost of milling is very greatly reduced, while for some purposes it can be dispensed with altogether, (2) the entire quantity of gum in the cotyledons is obtained in many cases and even when the gum is required for certain special purposes within five per cent. of the whole is extracted, (3) and in all cases the discoloring matter of the husk is prevented from flowing out and discoloring the gum. This latter result is absolutely necessary to obtaining the saving described under heads Nos. 1 and 2 as above mentioned.

In working this process I can take either the whole kernels or split kernels minus the germ but having all the husk attached or in some special cases above referred to where it is desired to eliminate the entire germ and at same time remove a small portion of the apex of the husk by doing which a small percentage of the dry cotyledons is also removed but the extraction of the gum is hastened and produced free from the delicate yellow color from the germ.

In the accompanying drawings, which illustrate the apparatus employed for carrying out my improved process, Figure 1 is a section of the vat in which the kernels are first treated, showing the agitators or beaters; Fig. 2 an elevation, partly in section, of the press for eliminating the gum from the bags; and Fig. 3 a diagrammatic elevation of the cooling plant, showing the cooling vat in section.

The process as actually conducted by me at the Gum Tragasol Company's Works at Hooton, is as follows: For clearest and brightest gum, I take 84 lbs. of split kernels, divested of germ only, and add thereto 16 gallons of cold water, and at the same time or immediately after, 25 oz. of commercial formalin of standard strength of 40% (or equivalent quantity of less strength), or produce the same in the solution by passing in the equivalent amount of formaldehyde. This is left to stand 1½ hours with preferably two or three stirrings during the period. During this time care is taken that the split kernels are entirely covered throughout with the water and formalin. I then add a little more water, stirring the kernels through it and then pump or run off all the liquid possible. The kernels have been all this time in the jacketed machine or mashing vat A where the gum is to be extracted. Immediately after the last operation, I add 26 gallons of cold water into which fifteen ounces more formalin is stirred. The entire contents are now left from 15 to 20 minutes in the cold, no heat having hitherto been applied. I then put on steam into the water jacket of the vat A bringing the temperature gradually up to 85 to 88 Fahr. and have even gone as high as 202 F. without any apparent injury to the product. I now continue to add half hourly or thereabout, about 20 gallons of hot water at a time, until about 3½ hours from the time of applying the heat, when I put in from 40 to 50 gallons of hot water. I can now go on by adding further quantities of water, to the point where the mashed kernels are ready for extracting the gum; or I can leave the material at any stage of the process all night or several nights and thereafter proceed to a finish. The total quantity of water added from first to last runs from 25 to 30 times the weight of the kernels steeped. The exact quantity required varies owing to the following causes: 1st. the age or quality of the beans, 2nd temperature employed; the higher the temperature within the above mentioned limits, the larger the quantity of water required. 3rd. the time during which the materials have lain steeping in the machine vat. The material now stands for two hours under heat, being occasionally stirred with the agitators B of the vat A, after which it is run into bags made of milling silk D, preferably No. 9, which are supported inside and out by cotton bags of very strong, open, net-like fabric. These bags are put into presses E having wooden fluted spacing blocks F, and gradually pressed by screw or hydraulic pressure. The exuding gum falls into copper hoppers G lined with tin, and runs down to cooling vats H over copper spouts I, lined with tin. The cooling vats H are jacketed so as to admit of the use of chilled brine, which is supplied from a refrigerating plant K, and the gum while cooling is stirred with powerful dashers J. If required to be stored, it is now medicated with any of the usual preservatives which may be desired, depending on the purpose to which it is to be applied, and after lying all night it is casked in the usual manner.

An alternative process which is somewhat cheaper than the above, as requiring less formalin, is as follows:—After adding the first mentioned quantity of formalin, that is 25 ounces, with the same quantity of cold water in the mashing vat, all may be allowed to remain till the water and formalin are entirely absorbed by the kernels, and even if left for days after this absorption has taken place, the material can then be proceeded with by adding water and heat as in the above mentioned process. The resulting gum though not as clear and unclouded as that by the first process is equally good for many purposes. I can also obtain equal results by using tri-oxymethylene which when dissolved in hot water evolves formalin or any of the derivatives of formaldehyde, but on account of differences in cost and facility of working prefer the formalin as stated above. I can also obtain somewhat similar results by using mineral and other naphthas and the various forms of alcohol instead of formalin, but for various reasons prefer formalin particularly because when it is used no other preservative or antiseptic is necessary except when it is to be kept for long periods before use, and after the gum is extracted in the usual way and cooled it emits no smell.

The freedom from discoloration is not obtained by precipitation as with charcoal etcetera where the discoloration appears again after the gum stands for some time, but the action of the formalin appears to be to entirely prevent the flow of the coloring matter from the husk and not a particle of it ever appears in the gum even when left standing for three to four months if the process has been carried out correctly.

I declare that what I claim is:—

1. The process of obtaining gum tragasol from the split locust kernels with the still adhering husks, which consists in soaking the same in cold water and a substance capable of rendering the coloring matter insoluble, gradually adding further water with heat and stirring, and pressing out the gum solution.

2. The process of obtaining gum tragasol from the split locust kernels, which consists in steeping the same in water and a substance capable of rendering the coloring matter insoluble until the cotyledons have swelled out, adding formalin and hot water and stirring until the materials are sufficiently cooked, and then pressing.

3. The process of obtaining gum tragasol from the split locust kernels, which consists in steeping the same in water and a substance capable of rendering the coloring matter insoluble until the cotyledons have swelled out, gradually adding further water with heat and stirring, pressing out the gum solution and quickly cooling the gum and, at the same time, subjecting it to agitation, separating any solid matters that may remain suspended and casking in the usual manner.

4. The process of obtaining gum tragasol from the split kernels, which consists in steeping the same in water and formalin until the kernels have swelled up, separating the solution, adding further water with heat and stirring, then pressing and straining, substantially as described.

5. The process of obtaining gum tragasol from the split locust kernels with the still adhering husks, which consists in soaking the same in water and a substance capable of rendering the coloring matter insoluble until the cotyledons have swelled out, adding further water with heat, and stirring, and separating the solid matter, substantially as described.

6. The improvement in the process of obtaining gum tragasol, which consists in converting the coloring matter of the husks into an insoluble compound by means of formalin before proceeding to extract the gum.

7. The improvement in obtaining gum tragasol, which consists in treating the split beans with long continued soaking in water and formaldehyde (formalin) and afterward extracting the gum from the cotyledons.

8. An improved article of manufacture, consisting of gum tragasol, characterized by it containing a solution of formaldehyde and being clear of the coloring matters of the husk.

9. An improved article of manufacture consisting of gum tragasol, characterized by it containing a solution of formaldehyde and being clear of the coloring matters of the husk and germ.

10. An improved step in the process of manufacturing gum tragasol, which consists in refrigerating the gum and agitating the same while it is in such refrigerated condition.

In witness whereof, I have hereunto signed my name this 23rd day of November 1905, in the presence of two subscribing witnesses.

P. C. D. CASTLE.

Witnesses:
  H. P. SHOOBRIDGE,
  JOHN McLACHLAN.